United States Patent [19]
Grenda

[11] Patent Number: 5,574,831
[45] Date of Patent: Nov. 12, 1996

[54] HIGH SPEED PRINTING USING AN ARRAY OF LOW SPEED PRINTERS

[76] Inventor: Robert Grenda, 7018 E. Roundup Way, Orange, Calif. 92669

[21] Appl. No.: 249,173

[22] Filed: May 25, 1994

[51] Int. Cl.⁶ ................................................ G06K 15/00
[52] U.S. Cl. ............................................ 395/104; 395/105
[58] Field of Search ..................................... 395/104, 116, 395/115, 114, 105, 112, 101, 113

[56] References Cited

U.S. PATENT DOCUMENTS

| | | | |
|---|---|---|---|
| 4,125,874 | 11/1978 | Higashide | 395/824 |
| 4,495,582 | 1/1985 | Dessert et al. | 364/469 |
| 4,587,532 | 5/1986 | Asano | 346/134 |
| 4,774,524 | 9/1988 | Warbus | 358/296 |
| 5,087,979 | 2/1992 | Schaertel | 358/296 |
| 5,179,636 | 1/1993 | Nardozzi | 395/114 |
| 5,220,674 | 6/1993 | Morgan et al. | 395/800 |
| 5,287,194 | 2/1994 | Lodiondo | 358/296 |
| 5,299,296 | 3/1994 | Padalino et al. | 395/112 |
| 5,428,464 | 6/1995 | Silverbrook | 395/109 |

*Primary Examiner*—Mark R. Powell
*Assistant Examiner*—Tracy M. Legree
*Attorney, Agent, or Firm*—Blakely, Sokoloff, Taylor & Zafman

[57] ABSTRACT

A printer system which allocates various pages of a job to a plurality of individual printers that each print a different page of the job. The system is therefore capable of increasing the speed of the job without requiring a faster engine speed. The printer system includes a plurality of print engines, a sequenced stacking device, imaging electronics to create raster image signals suitable for the video input of the print engines and control electronics to direct these electrical signals to each of the print engines on a page by page basis and to control the stacking device to direct printed sheets to the output stack in proper sequence. The stacking device loads the print images into a single properly sequenced output stack at a speed of n×i images per minute, wherein n is the number of print engines used and i is the speed of a single print engine in images per minute.

14 Claims, 4 Drawing Sheets

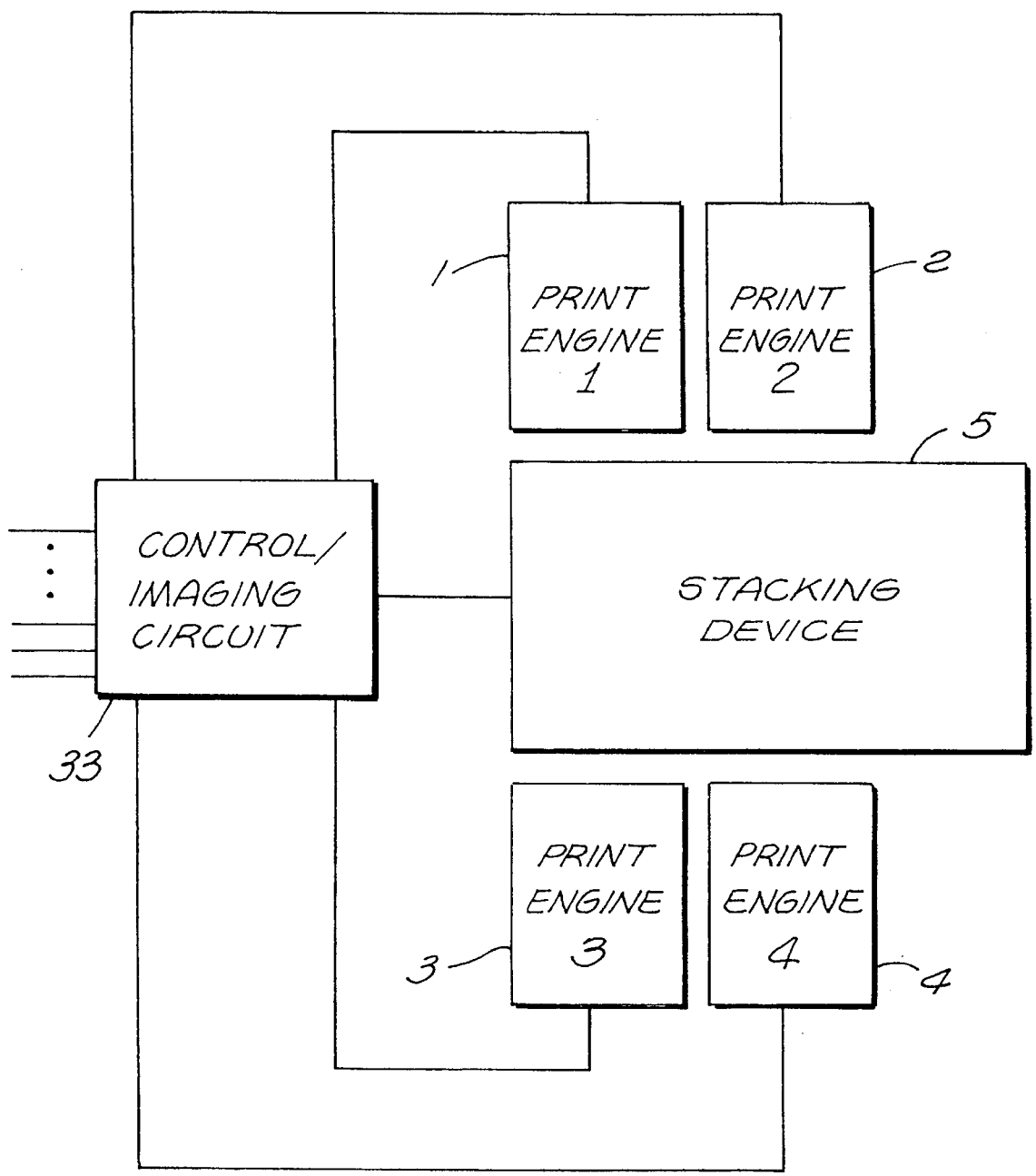
F I G. 5

HIGH SPEED PRINTING USING AN ARRAY OF LOW SPEED PRINTERS

BACKGROUND OF THE INVENTION

1. Field of the Invention

The present invention relates to a printing apparatus that has a plurality of print engines which each generate one of i printed images of a job and properly stack the printed images.

2. Description of Related Art

Currently there are printing machines that electronically image and print on sheets using a single print engine to produce printed output at a rate n images per minute. To obtain increased speed the print engine must be driven at an increased speed. The increased speed introduces various design problems including sensitivity of the photosensitive member, the developing process, cleaning, transferring and other processes limited by the mechanical construction. Ultimately there is a limit to increasing the speed of print engines to produce higher speed output.

U.S. Pat. No. 4,125,874 issued to Higashide et al. describes a technique for controlling the printing of data supplied by a processing unit at a plurality of remote printers. The Higashide system uses an addressing scheme wherein the processing unit can send out a plurality of addresses each designating a selected printer to print the data, then send out the data in only one transmission for printing by the selected printers.

U.S. Pat. No. 4,587,532 issued to Asano, describes a recording apparatus having a plurality of recording units. If more than one copy is requested, the copy job is divided among the available recording units to provide parallel printing.

U.S. Pat. No. 4,774,524 issued to Warbus et al., discloses a drive arrangement for a plurality of print engines in tandem where the recording medium is passed through two or more printing devices to achieve two-sided printing or multicolor printing. The invention describes synchronization methods to control the medium as it passes from device to device.

U.S. Pat. No. 5,179,637 issued to Nardozzi, discloses a system for distributing print jobs from a data source among a set of print engines and associated image processors of the type having an input data bus. A scheduler coupled to the bus receives data from a print image data source and transfers it to an image processor not currently processing received data. The image processor develops a set of print engine data files from the received data along with data indicating the number of copies of each image or page to be printed and the medium on which it is to be printed. The image processor then identifies print engines that are free and capable of printing images or pages of the data files and distributes the data via the input data bus to the free print engines through their respective image processors.

U.S. Pat. No. 5,220,674 issued to Morgan et al., discloses an improved print server that load balances the print jobs so certain printers are not idle while others have unserviced print requests in a queue. The server includes a resource manager for receiving resource requests from printers and in response forwards the resources to the printers.

U.S. Patent No. 5,287,194 issued to Lobiondo, discloses a print scheduling routine that provides optimum scheduling of jobs on a network. The routine uses the total complex of local and remote printers to allocate and complete printer jobs based on user criteria relating to job requirements including requested completion time. If a single printer cannot satisfy the criteria, the job is allocated to a plurality of printers each printing a portion of the complete job.

U.S. Pat. No. 5,299,296 issued to Padalino et al., describes an improved method of scheduling and switching between jobs in a multifunction machine such as a combination printer/copier/fax machine.

SUMMARY OF THE INVENTION

The present invention is a printer system which allocates various pages of a job to a plurality of individual printers that each print a different page of the job. The system is therefore capable of increasing the speed of the job without requiring a faster engine speed. The printer system includes a plurality of print engines, a sequenced stacking device, imaging electronics to create raster image signals suitable for the video input of the print engines and control electronics to direct these electrical signals to each of the print engines on a page by page basis and to control the stacking device to direct printed sheets to the output stack in proper sequence. The stacking device loads the print images into a single properly sequenced output stack at a speed of n×i images per minute, wherein n is the number of print engines used and i is the speed of a single print engine in images per minute.

BRIEF DESCRIPTION OF THE DRAWINGS

The objects and advantages of the present invention will become more readily apparent to those ordinarily skilled in the art after reviewing the following detailed description and accompanying drawings, wherein:

FIG 1b is a side view of the system shown in FIG. 1a;

FIG. 2 is a cross-sectional view taken at line A—A of FIG. 1a;

FIG. 5 is a block diagram of the components of the printer;

DETAILED DESCRIPTION OF THE INVENTION

Figure 1A:
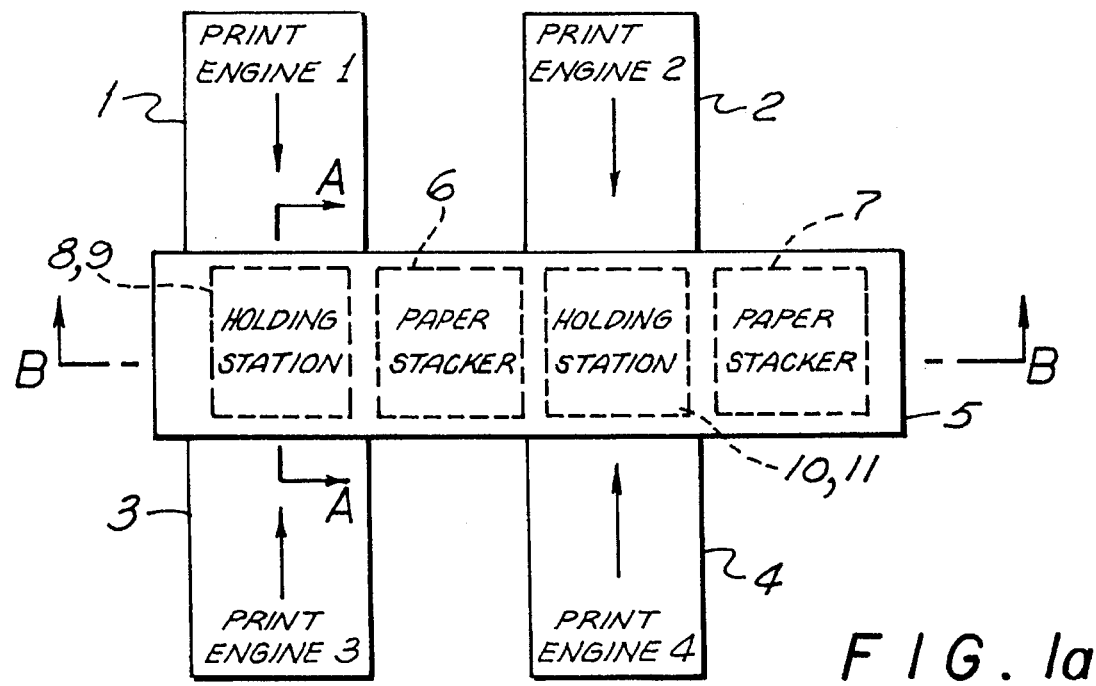
FIG. 1a is a top view of a printer system of the preset invention.
Figure 1B:
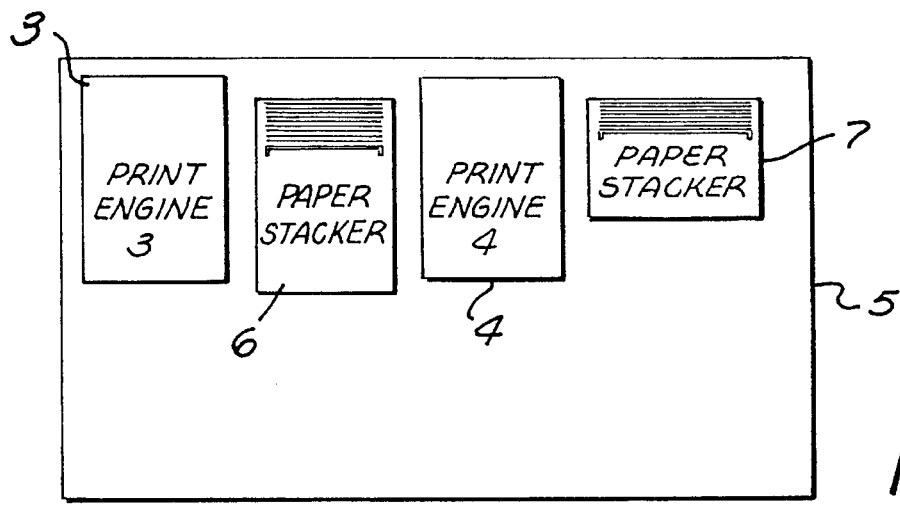

Referring to the drawings more particularly by reference numbers, FIGS. 1–6 show a printer system of the present invention. The system contains four print engines 1–4 that are coupled to a stacking device 5. Print engines 1 and 2 provide printed sheets on one side of the sequencing stacking device 5 and print engines 3 and 4 provide printed sheets on the opposite side of the device 5. Each print engine has a sheet delivery system and a supply of recording sheets. In the embodiment shown in FIG. 1b, the print engines 1–4 deliver the printed sheets into the sequencing stacking device 5 in a face down orientation. This orientation does not require the sheets to be turned over for proper sequencing.

The imaging electronics may be adapted to reverse the printed image from opposite pages to insure that the stack pages are all aligned (i.e. so that half of the pages are not upside down). For example, the printed image created by print engine 3 may be reversed from the printed image created by print engine 1. The system has paper stackers 6 and 7. Stacker 6 collects the printed images when print engines 1, 2, 3 and 4 are operating as a single printer. When all four print engines are operating the system has an output speed of 4×i, where i is the speed of each print engine. Stacker 6 is also the output stacker used when printers 1 and 3 are operated as a single printer with output speed 2×i. Stacker 7 collects the printed images when printers 2 and 4 are operated as a single printer with output speed 2×i.

Referring to FIG. 5, the system has a control/imaging circuit 33 that is coupled to input busses. The control/imaging circuit 33 accepts a print data stream from an external data source and creates bit images that are directed to the appropriate print engines 1–4. The print engines create printed images from the output of the control/imaging circuit 33.

Figure 6:
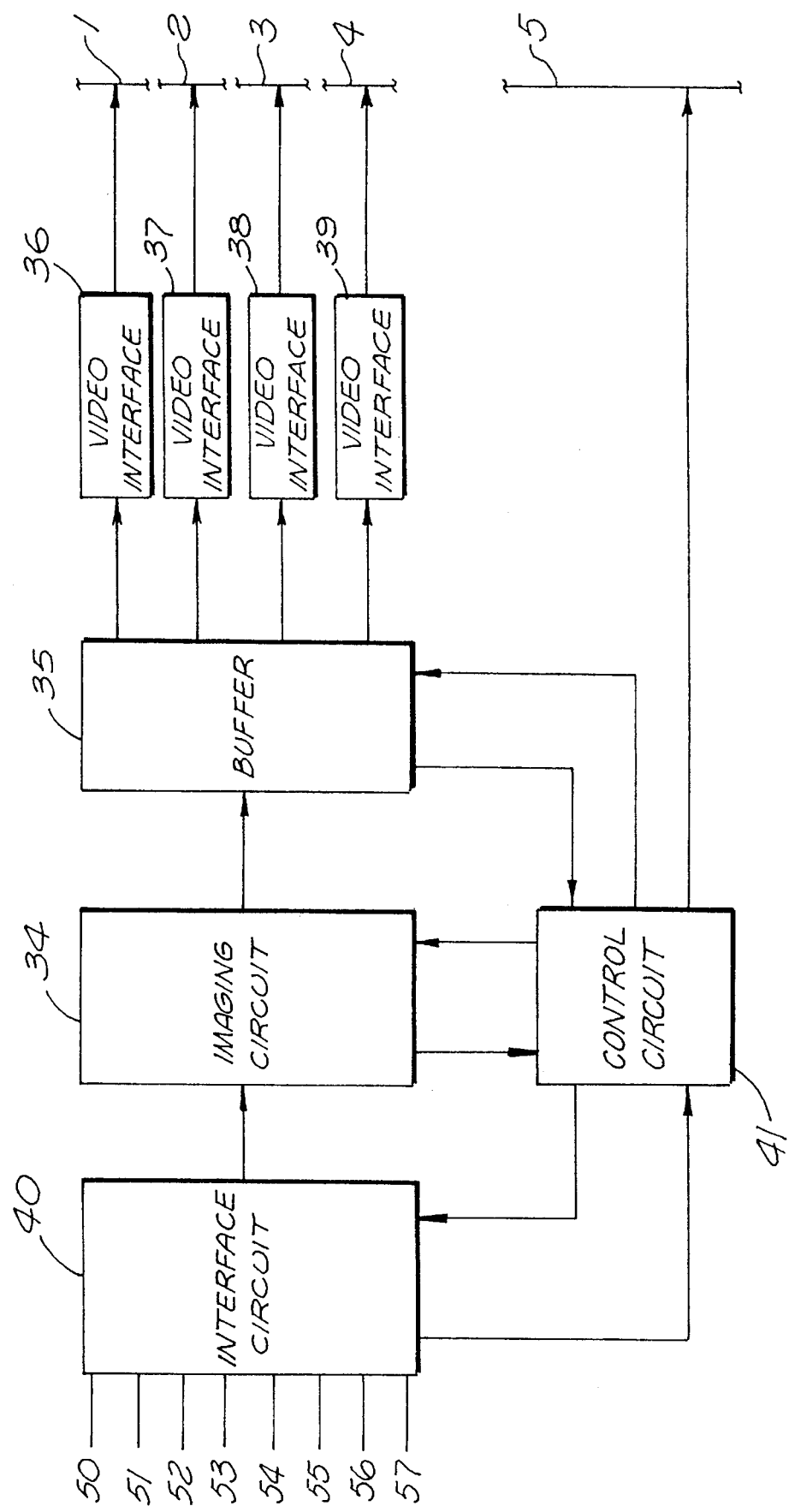
FIG. 6 is a block diagram of the imaging and control electronics.

Referring to FIG. 6, in the preferred embodiment the control/imaging circuit 33 contains an interface circuit 40 coupled to a control circuit 41 and an imaging circuit 34. The control circuit 41 monitors the interfaces 40 for input data stream activity. The control circuit 41 directs data from the interface 40 to the imaging circuit 34 which converts each page of the data stream to a raster image signal suitable for the video inputs of the print engines. The raster image is held temporarily in a buffer 35 to allow delay for the staggered operation of the print engines, for resynchronization if failures occur and for duplex operation (printing on both sides of a sheet of paper). At the proper time the control circuit 41 directs the raster image signal for the desired page to the appropriate print engine via video interfaces 36, 37, 38 or 39. For example, the control circuit may send the first page of a job to print engine 1, then subsequently send the second page of the job to print engine 2, and so forth and so on.

The interface 40 receives data streams from one of 8 different busses 50–57. Each bus correlates to a different printer engine configuration. With four print engines up to four configurations are possible. These configurations and the corresponding interfaces 50–57 are shown in the table below:

| CONFIG-URATION | INTER-FACE | DESCRIPTION |
| --- | --- | --- |
| 1 | 50 | Print engines 1, 2, 3 and 4 operated as a single printer with speed 4 × i images per minute when i is the speed of a single print engine. |
| 2 | 51 | Print engines 1, 2 and 3 operate as a single printer with speed 3 × i images per minute. Print engine 4 operates as a single printer with speed i images per minute. |
| 3 | 52 | Print engines 1 and 3 operate as a single printer with speed 2 × i images per minute. |
|  | 53 | Print engines 2 and 4 operate as a single printer with speed 2 × i images per minute. |
| 4 | 54 | Print engine 1 operates as a single printer with speed i images per minute. |
|  | 55 | Print engine 2 operates as a single printer with speed i images per minute. |
|  | 56 | Print engine 3 operates as a single printer with speed i images per minute. |
| 2 and 4 | 57 | Print engine 4 operates as a single printer with speed i images per minute. |

Each configuration uses all four print engines in a different arrangement and each configuration uses one, two or four active interfaces. When print engines are operated singly as in configurations 2 and 4 their output pages are directed to the normal output stacker that is a part of each print engine, in which case the sheets do not enter the sequencing stacking device 5. In configuration 3, print engines 1 and 3 and print engines 2 and 4 do have their output pages enter the stacking device and then directed to output stackers 6 and 7 respectively in FIGS. 1a and 1b.

Figure 2:
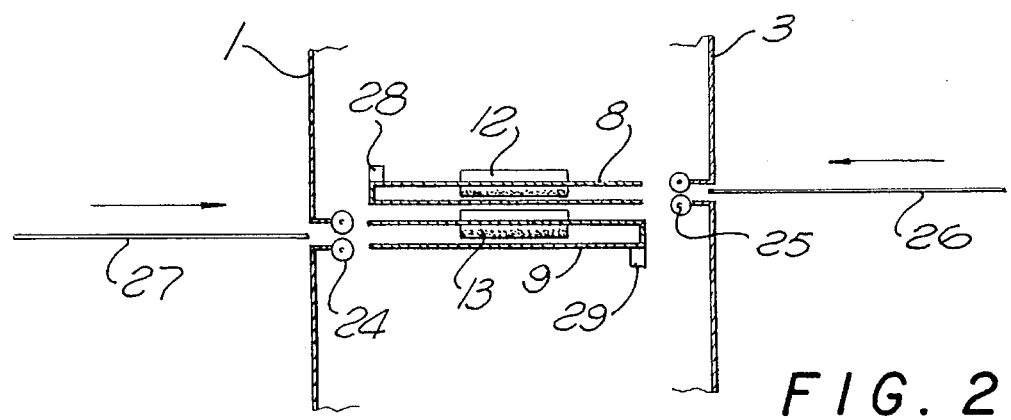
Figure 3:
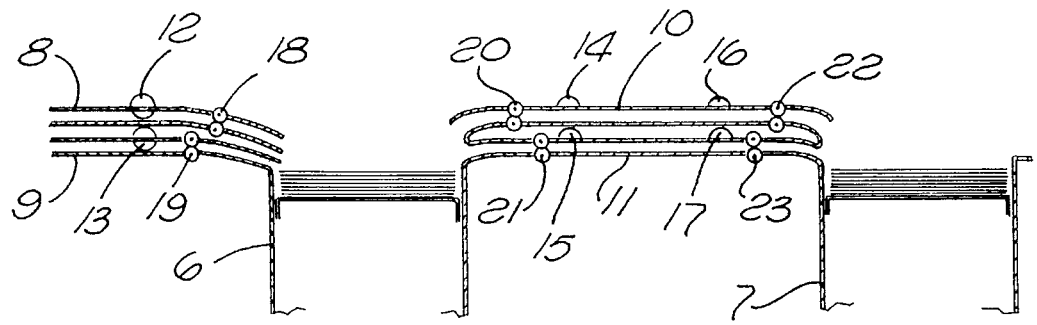
FIG. 3 is a cross-sectional view taken at line B—B of FIG. 1b.

As shown in FIGS. 2 and 3, the printer system includes a holding station 8 for print engine 3 and a holding station 9 for print engine 1. The system also contains holding stations 10 and 11 for printers 4 and 2, respectively. Drive rollers 24 and 25 move the imaged sheets into the respective holding stations. The purpose of a holding station is to change the direction of motion of an imaged sheet fed into the sequencing stacker from a print engine. The print engines 1 and 3 generate printed images on sheets 26 and 27 which roll into the holding stations 8 and 9. Movement of the sheets 26 and 27 into the holding stations is detected by sensors 28 and 29. Upon detection of sheets 26 and 27, drive rollers 12 and 13 are activated to move the sheet at 90° from the direction it entered the holding station.

Drive rollers 18 and 19 move the sheets from the holding stations into the stacker 6. Similarly, drive rollers 14 and 15 move sheets out of holding station 10 and 11 from print engines 4 and 2, respectively, and drive rollers 20 and 21 move these sheets into the stacker. When stacker 7 is used, sheets are fed in the opposite direction from holding stations 10 and 11 by drive rollers 16 and 17 and drive rollers 22 and 23 move these sheets into stacker 7.

The imaging and control electronics stagger the signals to each print engine in a sequential fashion so that sheets arrive in the holding stations in the same staggered sequence. This minimizes the transport speed of sheets in the sequencing stacking device. In a typical staggered sequence the imaging electronics directs page 1 of a print data stream to print engine 1, then delays a time 60÷(4×i) seconds before directing page 2 to print engine 2 and so forth until it comes back to print engine 1. Then the imaging electronics continues to direct subsequent pages or print data to each print engine in succession without delay as the print engines become ready to print more pages. As each sheet arrives at its holding station it is fed to the stacker. Since the pages exit each print engine face down and since the pages are supplied in proper sequence to the print engines, all sheets arrive at the stacker in proper sequence to produce a single output stack.

If stacker 7 is used the printing apparatus operates as two printers simultaneously. One printer system operates with print engines 1 and 3, and stacker 6. The other printer system operates with print engines 2 and 4, and stacker 7. Each printer operates at a speed of 2×i.

During operation, if a print engine fails the control circuit 33 immediately directs the electrical signals for the unprinted sheet to another print engine and removes the failed printer from the sequence in use. Printing continues with the remaining print engines at a reduced speed.

Figure 1C:
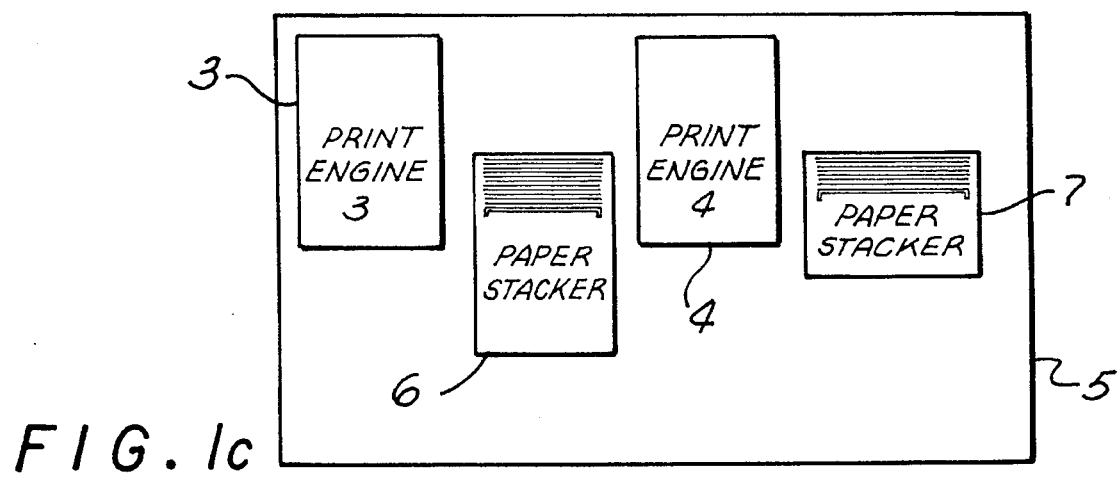
FIG. 1c is a side view similar to FIG. 1b, showing an alternate embodiment.
Figure 4:
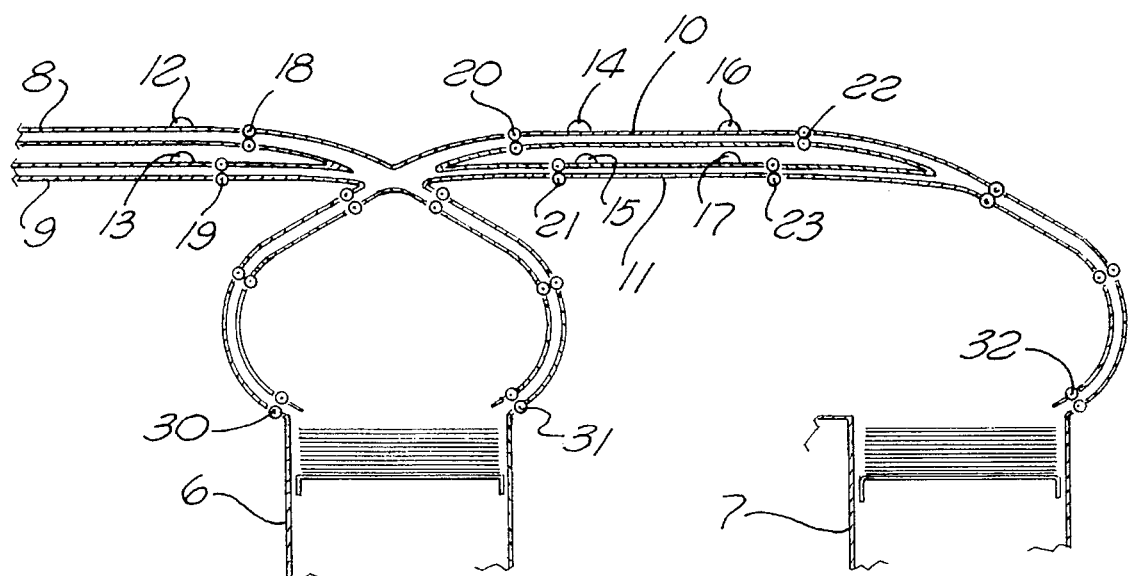
FIG. 4 is a cross-sectional view similar to FIG. 3 showing the alternate embodiment of FIG. 1c.

FIGS. 1c and 4 show an alternate embodiment of the present invention wherein the print engines deliver the printed sheets into the sequencing stacking device in a face up orientation. This orientation requires the sheets to be turned over for proper sequencing.

As shown in FIG. 4, drive rollers 18 and 19 move the sheets from the holding stations into a series of properly spaced drive rollers that turn the sheets over for proper sequence stacking. Drive rollers 20 and 21 move sheets from holding stations 10 and 11 into another series of properly spaced drive rollers that also turn the sheets over for proper sequence stacking. Drive rollers 30 and 31 at the end of each turnover track move the sheets into the stacker now located somewhat below the printers to accommodate the turnover. The two turnover tracks for stacker 6 cross near the holding stations.

Similarly, when stacker 7 is used, drive rollers 22 and 23 move the sheets from holding stations 10 and 11 into another series of properly spaced drive rollers that turn the sheets over. Drive rollers 32 move the sheets into the stacker. The staggered sequence of sheets from the print engines and the linear speed of sheets in the tracks prevents collision in the crossing and in the final stacker.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A printing system, comprising:

a first printer engine that can produce printed pages from electronic image data;

a second printer engine that can produce printed pages from electronic image data; and, an electronic image control device which can receive electronic image data that corresponds to a first printed page and a second printed page, and provide said electronic image data to said first and second printer engines such that said first printer engine produces the first printed page and said second printer engine produces the second printed page.

2. The printer system as recited in claim 1, further comprising a stacker mechanism that stacks the printed pages produced by said first and second printers.

3. The printer system as recited in claim 2, wherein said stacker mechanism includes a first holding station that receives the first printed page from said first printer engine, a second holding station that receives the second printed page from said second printer engine, and a stacker that receives the first and second printed pages from said first and second holding stations.

4. The printer system as recited in claim 3, wherein said stacker mechanism has a routing mechanism which rotates the printed pages 180° when the printed pages are received by said stacker.

5. The printer system as recited in claim 1, further comprising a third printer engine and a fourth printer engine coupled to said electronic image device such that said third and fourth printer engines produce a third printed page and a fourth printed page.

6. The printer system as recited in claim 1, wherein said electronic image control device sequentially provides said electronic image data to said first printer engine and then to said second printer engine.

7. The printer system as recited in claim 1, wherein said electronic image control device routes said electronic image data from said second printer engine to said first printer engine in response to a failed status signal received from said second printer engine.

8. A printing system, comprising:

a first printer engine that can produce printed pages from electronic image data;

a second printer engine that can produce printed pages from electronic image data;

a third printer engine that can produce printed pages from electronic image data;

a fourth printer engine that can produce printed pages from electronic image data;

an electronic image control device which can receive electronic image data that corresponds to a first printed page, a second printed page, a third printed page and fourth printed page, and provide said electronic image data to said first, second, third and fourth printer engines such that said first printer engine produces the first printed page, said second printer engine produces the second printed page, said third printer engine produces the third printed page and said fourth printer engine produces the fourth printed page; and, a stacker mechanism that stacks the printed pages produced by said first, second, third and fourth printers.

9. The printer system as recited in claim 8, wherein said electronic image control device sequentially provides said electronic image data initially to said first printer engine, then to said second printer engine, then to said third printer engine and then to said fourth printer engine.

10. The printer system as recited in claim 9, wherein said stacker mechanism includes a first holding station that receives the first printed page from said first and third printer engines, a second holding station that receives the second printed page from said second and fourth printer engines, and a stacker that receives the first, second, third and fourth printed pages from said first, second, third and fourth holding stations.

11. The printer system as recited in claim 10, wherein said stacker mechanism has a routing mechanism which rotates the printed pages 180° when the printed pages are received by said stacker.

12. The printer system as recited in claim 11, wherein said electronic image control device routes said electronic image data from said fourth printer engine to said first, second or third printer engine in response to a failed status signal received from said fourth printer engine.

13. A method for generating a plurality of printed pages printed, comprising the steps of:

a) generating electronic image data that correspond to a first printed page and a second printed page;

b) sending said electronic image data that corresponds to the first printed page to a first printer engine;

c) sending said electronic image data that corresponds to the second printed page to a second printer engine; and, d) generating first and second printed pages from said electronic image data.

14. The method as recited in claim 13, further comprising the step of stacking the second printed page with the first printed page.

* * * * *